(No Model.)

L. L. BURDON.
FINGER RING.

No. 404,956. Patented June 11, 1889.

WITNESSES,
Charles Hannigan
Joseph Sanford

INVENTOR,
Levi L. Burdon.
by Remington & Hawthorn
Att'ys.

UNITED STATES PATENT OFFICE.

LEVI L. BURDON, OF PROVIDENCE, RHODE ISLAND.

FINGER-RING.

SPECIFICATION forming part of Letters Patent No. 404,956, dated June 11, 1889.

Application filed October 4, 1888. Serial No. 287,160. (No model.)

*To all whom it may concern:*

Be it known that I, LEVI L. BURDON, a citizen of the United States, residing at Providence, in the county of Providence and State of Rhode Island, have invented certain new and useful Improvements in Finger-Rings, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Heretofore, in the manufacture of plated rings, chain-links, bracelets, &c., such articles have possessed inherent longitudinal seams, which are more or less visible, according to the nature of the material used in soldering such seams. The seam is objectionable in many ways, it is unsightly, and in making up the goods the workman endeavors to conceal it as much as possible. If it is soldered, the cost of the articles is necessarily increased, particularly so when gold solder is used.

The object I have in view is to produce rings, &c., of the class above referred to—*i. e.*, plated or filled—in which the longitudinal seam is entirely dispensed with, the only seam being (in the case of rings and links) that due to the soldering of the two ends after bending, the articles thus made possessing the general characteristics of solid-gold work.

My improvement is useful, further, in that two grades of gold or other stock may be employed—that is, the interior of the ring may be, say, ten-carat gold, and the exterior seamless surface eighteen carat, as desired. The goods may also be hollow and at the same time seamless.

My invention consists of a ring or other article of jewelry having an integral and continuous external surface of gold or other suitable metal united to an internal or filling portion of inferior metal, the whole being seamless throughout except a transverse seam due to the soldering of the ends—as, for example, in rings and links.

In the accompanying sheet of drawings I have represented my improvement as embodied in rings, although obviously other articles may be included that shall possess the novel features of the invention. The drawings also represent by contrast the usual form and construction of such rings, &c.

Figure 1:
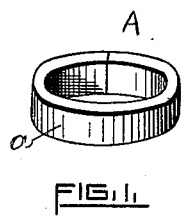
Figure 2:
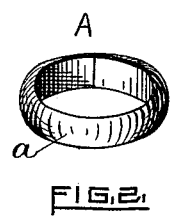
Figure 3:
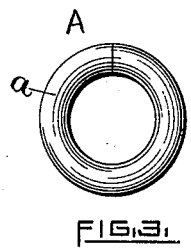
Figure 12:
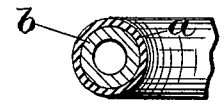
Figure 4:
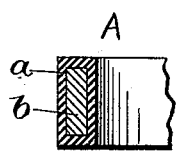
Figure 5:
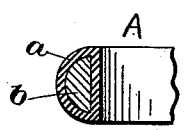
Figure 7:
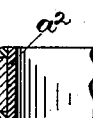
Figure 8:
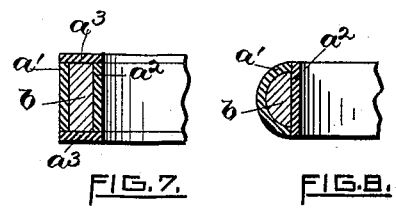
Figure 6:
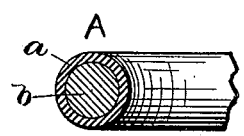
Figure 13:
Figure 9:
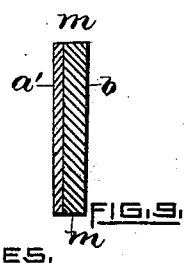
Figure 10:
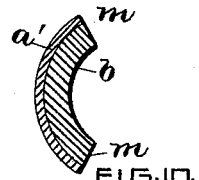
Figure 11:
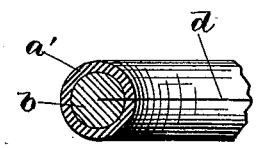

Figures 1, 2, and 3 represent perspective views of my improved seamless rings. Figs. 4, 5, and 6 represent corresponding cross-sectional views enlarged, the relative proportion or thickness of the seamless outer surface or plating to the inner or filling metal being considerably exaggerated. Figs. 7 and 8 show similar sectional views of rings as usually constructed. Figs. 9, 10, and 11 represent, sectionally, steps in the usual manner of producing plated rings. Fig. 12 is a cross-sectional view of my improved hollow seamless plated ring; and Fig. 13 is a similar view of a filled ring, as common.

The following is a more detailed description of my improvement:

A indicates a ring or other article of jewelry having a longitudinally-seamless exterior united to a filling material of less value.

$a$ designates the plating metal or shell, as gold, surrounding and inclosing the filling $b$, of inferior metal. The said shell may bear any practical proportion to the interior or core $b$, the relative proportions as drawn being considerably exaggerated.

A manner of constructing the rings, &c., hereinbefore referred to and possessing my invention is as follows: The gold or plating shell $a$ is made seamless and of the desired size and thickness. The tube may be produced by what is termed a "drawing" process—that is, a disk or blank is bent to a cup-shaped form and subsequently progressively reduced and elongated by means of suitable dies mounted in a press or other reciprocating machine adapted for the purpose. When the tube has been reduced to the desired size and length, the filling material $b$, of inferior composition metal, as brass, copper, &c., is inserted in a melted form, or it may be introduced and soldered to the interior of the shell, the manner of producing the seamless plated stock forming no part of my present invention. In case the articles to be made, say, are rings or links, the seamless stock is bent and the ends united by solder, thereby producing plated and longitudinally-seamless filled rings, examples of which are shown in Figs. 1 to 6, inclusive.

The usual construction of filled or plated rings, &c., is represented in Figs. 7, 8, &c., wherein the plating metal consists of two or more pieces united by solder to each other and to the filling metal $b$ and producing longitudinal seams in the rings or other articles made from such soldered stock.

In Fig. 7 the vertical sides of the stock consist of the outer and inner gold plates $a'$ $a^2$, respectively, which are capped by the gold edge plates $a^3$.

Fig. 8 represents a ring having a half-round form in cross-section. The outer or convex gold plate is indicated by $a'$ and the inner plate by $a^2$. The two are soldered together and inclose the filling $b$.

Figs. 9, 10, and 11 represent, sectionally, another well-known method of producing plated rings, &c. The stock is composed of the gold plate $a'$, united to the backing $b$, of inferior metal. The narrow sides $m$ are gradually brought together by successive bendings and rollings and the incidental annealings, the several operations being performed in machines constructed and adapted for the purpose, as usual.

In Fig. 11 the stock is represented as finally shaped, the two edges $m$ having been brought together, thereby producing a ring circular in cross-section and having the longitudinal seam $d$ extending throughout its length, the backing now constituting the filling $b$ of the ring.

In Fig. 13 is represented still another method of producing filled stock. In this case the gold plate $a'$ is made into a channel form, after which the filling metal $b$, as copper, is run into it in a melted state, the whole being finished by the addition of the inner plate $a^2$, which is soldered thereto. This method, it will be noticed, necessitates two longitudinal seams, which must be soldered with gold to conceal them as much as possible. As hereinbefore stated, in all such former methods of manufacture one or more longitudinal seams have been inherent in rings, chain-links, &c., the soldering of which, together with the care exercised by the workman in concealing the seam, obviously adds greatly to the cost of the production of such articles.

By means of my improvement all longitudinal seams are entirely dispensed with, thereby permitting the workman to work with greater rapidity, the goods produced being superior in quality.

I claim as my invention—

1. As a new article of manufacture, a ring or other class of articles, as hereinbefore described, having a longitudinally roundabout seamless plated exterior surface of metal and an interior portion of inferior metal, substantially as and for the purpose set forth.

2. The ring or other analogous articles hereinbefore described, consisting of a piece of plated or composite externally-seamless wire bent and united at the abutting ends by solder, substantially as specified.

3. A composite ring having a roundabout seamless exterior surface $a$, of suitable metal, as alloyed gold, and an interior or filling portion, as $b$, of inferior metal or composition of metals united to said exterior portion, and having the ends of the ring united, substantially as shown and hereinbefore described.

4. The ring hereinbefore described, consisting of the exterior plate or shell $a$, of alloyed gold, seamless roundabout, and the interior or filling portion $b$, of gold of less value, united to the shell, thereby producing a filled ring having gold of different qualities, substantially as shown and set forth.

5. The composite tubular ring hereinbefore described, consisting of the longitudinally-seamless exterior plate or shell $a$ and the longitudinally-seamless interior shell of inferior metal united to the outer shell, substantially as set forth.

In testimony whereof I have affixed my signature in presence of two witnesses.

LEVI L. BURDON.

Witnesses:
CHARLES HANNIGAN,
GEO. H. REMINGTON.